(12) United States Patent
Tsai

(10) Patent No.: US 7,196,798 B2
(45) Date of Patent: Mar. 27, 2007

(54) OPTICAL ALIGNMENT METHOD AND APPARATUS

(75) Inventor: John C. Tsai, Saratoga, CA (US)

(73) Assignee: Excel Precision Corporation, Santa Clara, CA (US)

( * ) Notice: Subject to any disclaimer, the term of this patent is extended or adjusted under 35 U.S.C. 154(b) by 379 days.

(21) Appl. No.: 10/710,216

(22) Filed: Jun. 25, 2004

(65) Prior Publication Data

US 2005/0024649 A1 Feb. 3, 2005

Related U.S. Application Data

(60) Provisional application No. 60/481,021, filed on Jun. 25, 2003.

(51) Int. Cl.
*G01B 11/02* (2006.01)

(52) U.S. Cl. ...................................... 356/500; 356/400
(58) Field of Classification Search ................ 356/498, 356/500, 508, 399–401, 614
See application file for complete search history.

(56) References Cited

U.S. PATENT DOCUMENTS 6,528,762 B2 * 3/2003 Mayer .................. 219/121.83

* cited by examiner

*Primary Examiner*—Gregory J. Toatley, Jr.
*Assistant Examiner*—Marissa J. Detschel
(74) *Attorney, Agent, or Firm*—Raymond E. Roberts; Intellectual Property Law Offices

(57) ABSTRACT

A method establishing a reference point for a machine tool with X-, Y-, and Z-stages. A YZ-plane is established by reflecting a light beam off an X-stage reflector such that the light beam is sensed at an interference detector. The X-stage is moved while repositioning the head and reflector and maintaining sensing. An optical alignment module (OAM) is mounted optically perpendicular to the beam, with a bending mirror centered at the Z-axis. The Z-axis is established by setting the bending mirror to deflect the beam to the Z-axis, reflecting it off of a Z-stage reflector so it is sensed, and moving the Z-stage while repositioning the OAM relative to the X- and Y-axes to maintain sensing. An XY-plane is established by bending mirror deflecting the beam to the Y-axis, reflecting it off of a Y-stage reflector so it is sensed, and moving the Y-stage while repositioning the Y-reflector relative to the X- and Z-axes to maintain sensing.

25 Claims, 10 Drawing Sheets

OPTICAL ALIGNMENT METHOD AND APPARATUS

This application claims the benefit of U.S. Provisional Application No. 60/481,021, filed Jun. 25, 2003.

TECHNICAL FIELD

The present invention relates generally to set-up and calibrate multi-axis machine tools, and particularly computer numerical control (CNC) and coordinate measuring machine (CMM) systems.

BACKGROUND ART

The laser interferometer is an important device for calibrating multi-axis machine tools, particularly including computer numerical control (CNC) and coordinate measuring machine (CMM) systems. In fact, the laser interferometer is currently the only device known to the inventor that is used for calibrating the latter types of equipment. With the rising demand for precise, machined parts in industry, the use of machine tooling in general, and CNC and CMM tools in particular, is increasing and calibrating these systems is becoming more and more important.

The traditional laser interferometer, however, is not a very user-friendly device. It can require almost eight hours to carry out a typical complete calibration of one CNC/CMM system today. This is because complete calibration involves six parameters for each axis, as well as three parameters for the interfacing planes, thus totaling at least 21 parameters that need to be measured, adjusted, re-measured, re-adjusted, etc., in a typical CNC/CMM system. In a traditional approach, a laser interferometer is used to measure these parameters, one-by-one, with optical and mechanical devices dedicated as each particular parameter is addressed in turn.

The users of CNC/CMM systems consequentially often have to bear the cost of a calibration specialist, as well as the loss of revenue, staff re-tasking, etc., while the CNC/CMM system is unavailable. Many users, therefore, choose to either extend the scheduled period between calibrations, or to only undertake calibration when it becomes obvious that there is no other alternative. The net result of all of this is often the production of poor quality parts and considerable waste.

To help the reader understand the 21 parameters that typically must be considered, and how a traditional laser interferometer is used to calibrate these in a CNC or CMM system, we now briefly discuss the principles involved. Additional detail can be found in user manuals for commonly used laser interferometer products, such as the 1100A from Excel Precision, Corporation of Santa Clara, Calif.; the 5529A from Agilent Technologies of Palo Alto, Calif.; or the MT10 from Renishaw, PLC, New Mills, Wotton-under-Edge, Gloucestershire, United Kingdom.

FIG. 1 (background art) is a conceptual block diagram depicting object movement. Basically, there are six degrees of freedom when an object is moving along a predetermined axis. These are: linear displacement along the axis, pitch, yaw, roll, horizontal straightness, and vertical straightness. Both CNC and CMM machines typically have three axes of movement. In a CNC system these are usually provided by two carriages or stages, one each for X- and Y-direction motion, and a spindle for Z-direction motion. In a typical CMM system these are usually provided by X, Y, and Z carriages. Both CNC and CMM machines thus have 18 parameters describing these. In addition, the perpendicularity between the three axes (X-Y, Y-Z, Z-X) also needs to be measured, bringing the total number of parameters that must be considered up to 21. Furthermore, current sophisticated machine tools may even have five axes of motion, for instance, permitting a spindle to be used "conventionally" in a Z-direction that is orthogonal to X and Y stages or to be rotated and be used at non-normal angles relative to the XY-plane.

In traditional laser interferometer based calibration schemes, displacement is measured using a "linear interferometer." Pitch and yaw are separately measured using an "angular interferometer." Horizontal straightness and vertical straightness are then measured separately using a "straightness interferometer." The perpendicularity among the three axes is measured separately using an "optical square." The measurement of roll is not achievable with a traditional laser interferometer.

The various parameters for calibration of multi-axis machine tools are therefore measured one-by-one, with different optics and mechanical mounting tools mounted and dismounted during the process. In particular, the laser head needs to be readjusted or repositioned every time that new optics are installed. And since positional accuracy is lost in each such change, a new reference has to be established whenever the laser head is moved.

It follows that shortening the time required for laser interferometer calibration of CNC/CMM systems is very desirable. One approach to this has been to use Excel Precision Corporation's dual laser beam 1100B laser calibration system. This system enables a user to more easily calibrate the six degrees of freedom for each moving axis of a CNC or CMM system, and it reduces the typical calibration time needed from eight hours to less than three. However, like traditional systems, the 1100B system can only measure one axis at a time, and the laser head used therefore needs to be moved and oriented and the alignment process started over for each axis.

Accordingly, it is desirable to have an approach, embodied in suitable methods and apparatuses, that will further reduce the calibration time for multi-axis machine tool systems by aligning all the moving equipment axes during initial set up, and that will permit measuring the parameters of interest without further adjustment of the laser head.

DISCLOSURE OF INVENTION

Briefly, one preferred embodiment of the present invention is a method for establishing a reference point for a multi-axis machine tool. The machine tool has an X-stage that is movable along an X-axis, a Y-stage that is movable along a Y-axis, and a Z-stage that is movable along a Z-axis. A YZ-plane is established for the machine tool by reflecting a light beam from a laser head off of an X-reflector on the X-stage, so the light beam is sensed by a detector. Then the X-stage is moved while repositioning the laser head and the X-reflector as needed so the light beam remains sensed by the detector, thus aligning the light beam with the X-axis. An optical alignment module (OAM) having a beam bending mirror is placed on the X-stage with its beam bending mirror nominally centered about the Z-axis. The OAM is aligned to be optically perpendicular to the light beam, thus aligning the OAM relative to the YZ-plane. The Z-axis of the machine tool is then established by setting the beam bending mirror to deflect the light beam from the X-axis to the Z-axis. The light beam is reflected off of a Z-reflector on the Z-stage so the light beam is sensed by the detector. Then the Z-stage is moved while the OAM to repositioned as needed relative to the X-axis and the Y-axis so the light beam remains sensed by the detector, thus aligning portions of the light beam parallel to both of the X-axis and the Z-axis. An XY-plane is then established for the machine tool by setting the beam bending mirror to deflect the light beam from the X-axis to the Y-axis. The light beam is reflected off of a Y-reflector on the Y-stage so the light beam is sensed by the detector. Then the Y-stage is moved while the Y-reflector is repositioned as needed relative to the X-axis and the Z-axis so the light beam remains sensed by the detector, thus aligning portions of the light beam parallel to both of the X-axis and the Y-axis.

Briefly, another preferred embodiment of the present invention is an optical alignment module (OAM) for establishing a reference point for a multi-axis machine tool when an X-stage of the machine tool that is movable along an X-axis and has an X-reflector, a Y-stage of the machine tool that is movable along a Y-axis and has a Y-reflector, and a Z-stage of the machine tool that is movable along a Z-axis and has a Z-reflector. A main base is provided to support the OAM on the machine tool and a mounting base is provided on the main base. A bending mirror is movably mounted in the mounting base, to receive a light beam from a laser head that is incoming nominally along the X-axis and to deflect the light beam from the X-axis to the Z-axis, to the Z-reflector, and to a detector or, alternately, to deflect the light beam from the X-axis to the Y-axis, to the Y-reflector, and to the detector.

Briefly, another preferred embodiment of the present invention is an optical alignment module (OAM) for establishing a reference point for a multi-axis machine tool with an X-stage of the machine tool that is movable along an X-axis having an X-reflector, a Y-stage of the machine tool that is movable along a Y-axis having a Y-reflector, and a Z-stage of the machine tool that is movable along a Z-axis having a Z-reflector. A base means is provided to support the OAM on the machine tool, and a mounting means is provided on the base means. A light bending means receives a light beam from a laser head that is incoming nominally along the X-axis. The light bending means is further movably mounted in the mounting means, for deflecting the light beam from the X-axis to the Z-axis, to the Z-reflector, and to a detector or, alternately, for deflecting the light beam from the X-axis to the Y-axis, to the Y-reflector, and to the detector.

An advantage of the present invention is that it significantly shortens the time needed for set-up and calibration of a multi-axis machine tool, such as computer numerical control (CNC) and coordinate measuring machine (CMM) systems.

Another advantage of the invention is that it does not require moving a laser head during set-up and calibration of a multi-axis machine tool, thus reducing opportunity for errors and improving accuracy and repeatability.

Another advantage of the invention is that it can reduce or eliminate the need for a calibration specialist set-up and calibration of a multi-axis machine tools.

And another advantage of the invention is that it can work with single and multi-beam laser heads, thus providing improvements in set-up and calibration times as well as the providing the additional accuracy and measurement parameter capabilities that the latter type of laser head provides.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which:

FIG. 9–10 are conceptual top views showing how the OAM embodiments of FIG. 7–8 can be used to observe non-orthogonality, wherein FIG. 9 shows light beam paths when X and Y stage movements are perpendicular, and FIG. 10 shows how non-orthogonality is measured when Y-movement is not exactly perpendicular to the X-stage.

In the various figures of the drawings, like references are used to denote like or similar elements or steps.

BEST MODE FOR CARRYING OUT THE INVENTION

Figure 1:
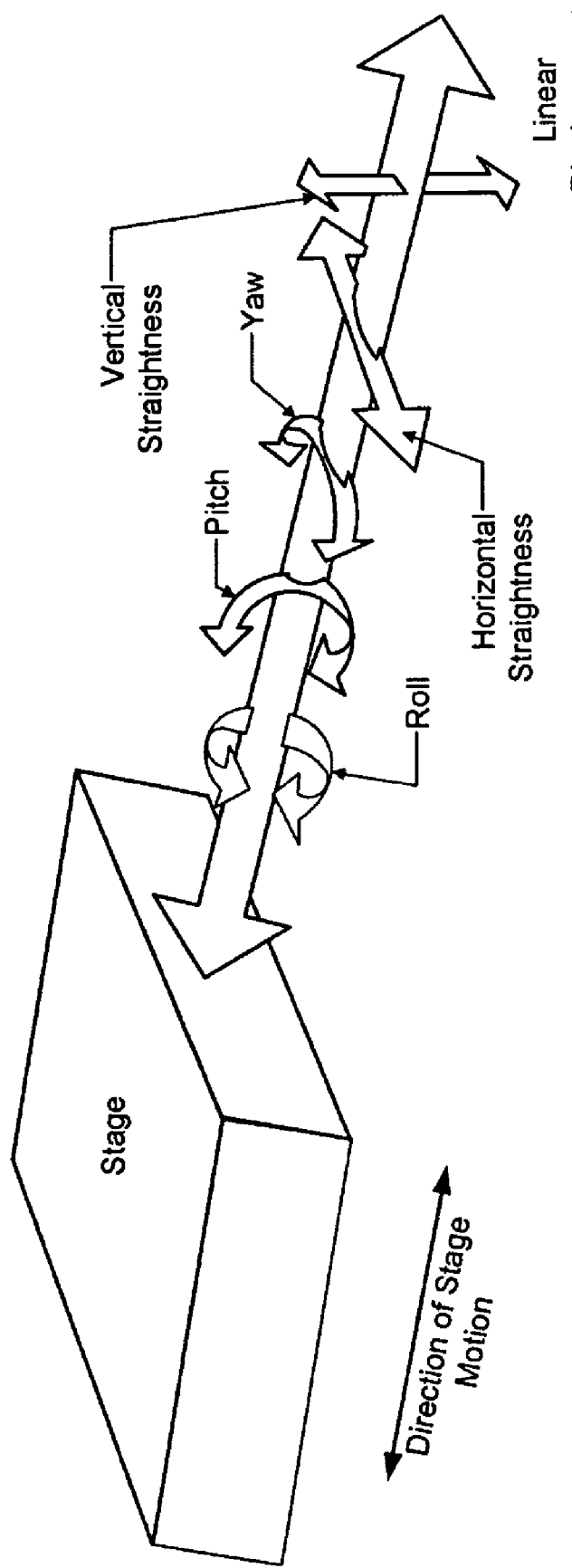
FIG. 1 (background art) is a conceptual block diagram depicting object movement.

A preferred embodiments of the present invention are methods and apparatus for optical alignment to calibrate multi-axis machine tools, particularly including computer numerical control (CNC) and coordinate measuring machine (CMM) systems. As illustrated in the various drawings herein, and particularly in the views of FIG. 2–10, exemplary embodiments of the invention are depicted by the general reference character 10.

The inventive method and apparatus permit a single set-up of a laser head, and measurement of the axes of a multi-axis machine tool such as a CNC or CMM system. This approach is generally applicable to any type of laser head used for such calibration, to reduce the overall set up time as well as to preserve accuracy, because the laser head does not have to be repeatedly repositioned.

Figure 2:
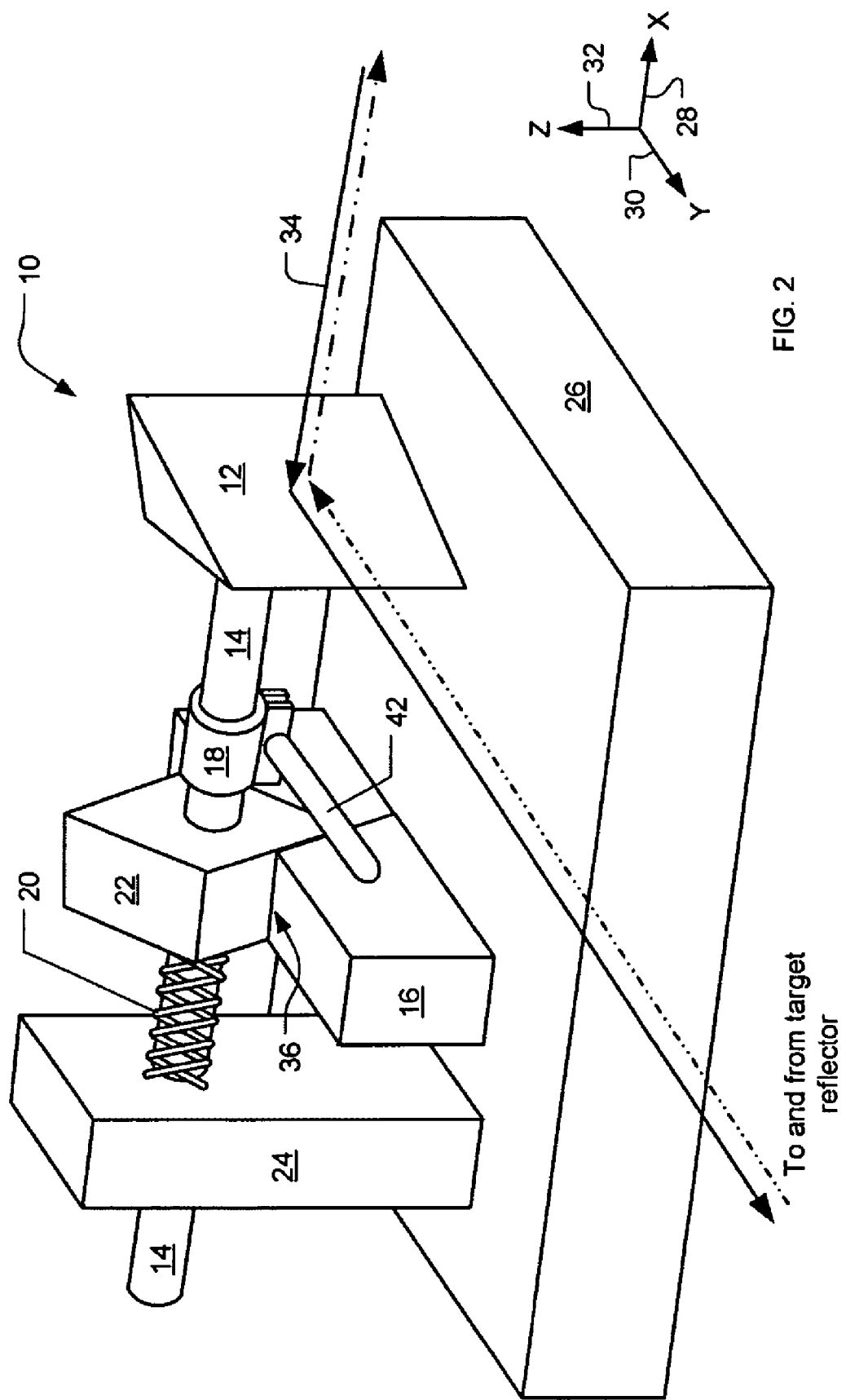
FIG. 2 is a conceptual side perspective view showing an example of a basic embodiment of an optical alignment module (OAM) in accord with the present invention.

FIG. 2 is a conceptual side perspective view showing an example of a basic embodiment of an "optical alignment module" (OAM 10) in accord with the present invention. This configuration includes of a bending mirror 12, a shaft 14 attached to the bending mirror 12, a mounting base 16, a sleeve 18 over the shaft 14 and a spring 20 over the shaft 14 between a square section 22 of it and a standoff 24. The standoff 24 is fixed to a main base 26 that does not move and hat typically will be part of a housing (not shown here; see e.g., FIGS. 5, 9, and 10). An X-axis 28, a Y-axis 30, and a Z-axis 32 of the OAM 10 are defined as shown.

The bending mirror 12 is set at 45-degrees with respect to the X-axis 28, which is the defined direction of an incident light beam 34. The bending mirror 12 is attached to the shaft 14, which can rotate either clockwise or counterclockwise. If the initial position of the bending mirror 12 deflects the light beam 34 from the X- to the Z-direction, either a clockwise or counterclockwise 90-degree rotation will then deflect the incident light beam 34 from the X- to the Y-direction.

The cross section of the shaft 14 can be made of any shape but a portion is preferably made square (e.g., the square section 22 in FIG. 2). This shaped section is then used as an alignment tool after rotation is made. A 90-degree V-groove 36 is provided in the mounting base 16 to match with the square section 22 so that gravity will help to bring the shaft 14 down into the bottom of the V-groove 36. The use of the square section 22 in the shaft 14 thus allows it to rotate only in 90-degree steps.

Figure 3:
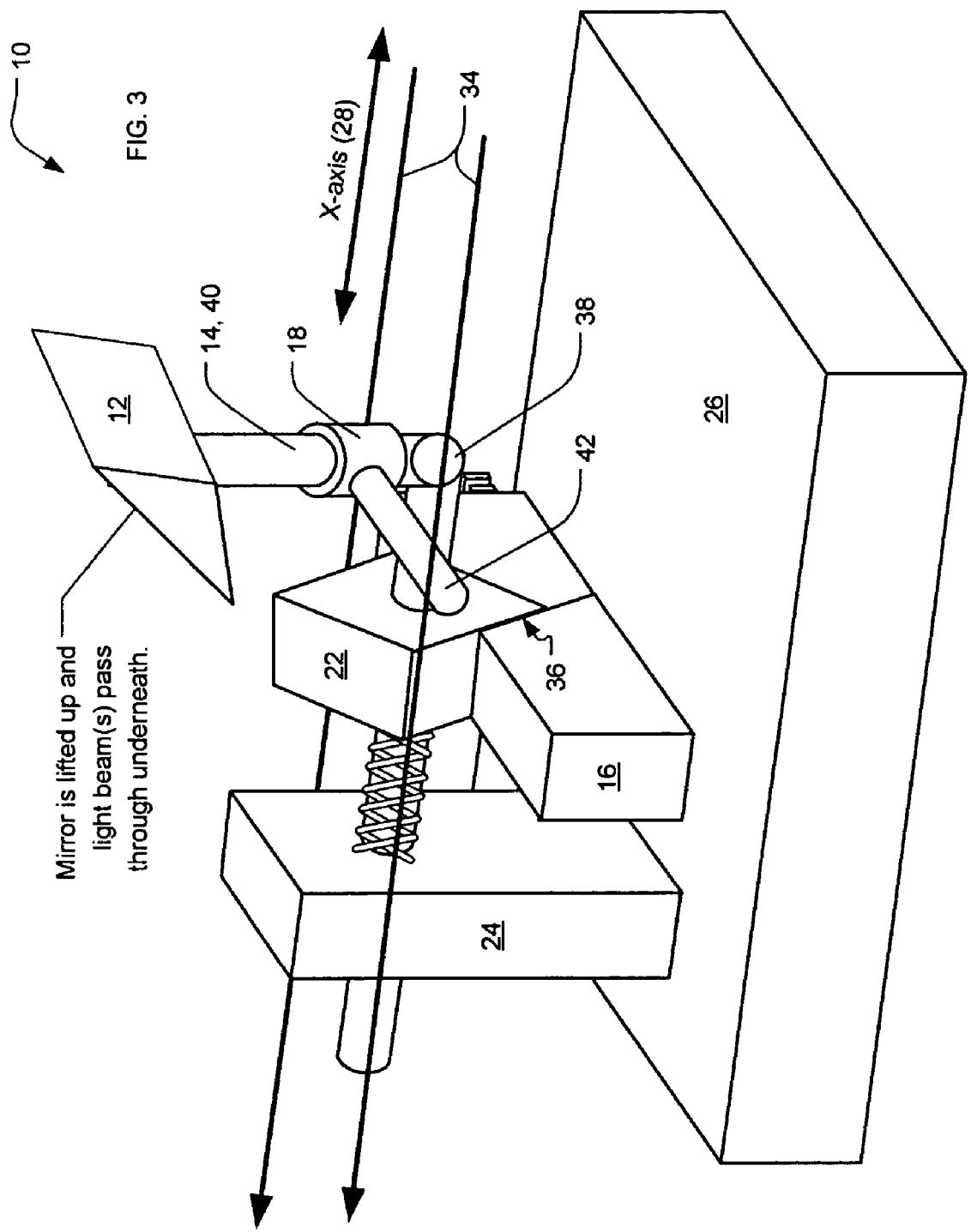
FIG. 3 is a conceptual side perspective view showing usage related detail for the basic OAM introduced in FIG. 2.

FIG. 3 is a conceptual side perspective view showing usage related detail for the basic OAM 10 introduced in FIG. 2. A hinge 38 is provided between the bending mirror 12 and the square section 22 of the shaft 14 that allows a frontal portion 40 of the shaft 14 to bend upward. The hinge 38 keeps the shaft 14 straight when the bending mirror 12 is used to deflect the light beam 34 in either the Y- or Z-directions, and when X-direction measurement is performed the hinge 38 permits bending the frontal portion 40 of the shaft 14 upwards to clear the path for the light beam 34 (or light beams 34 plural, as the case may be). This bending is accomplished in the shown embodiment by moving the sleeve 18 away from the hinge 38 and moving a handle 42 upwards.

Figure 4:
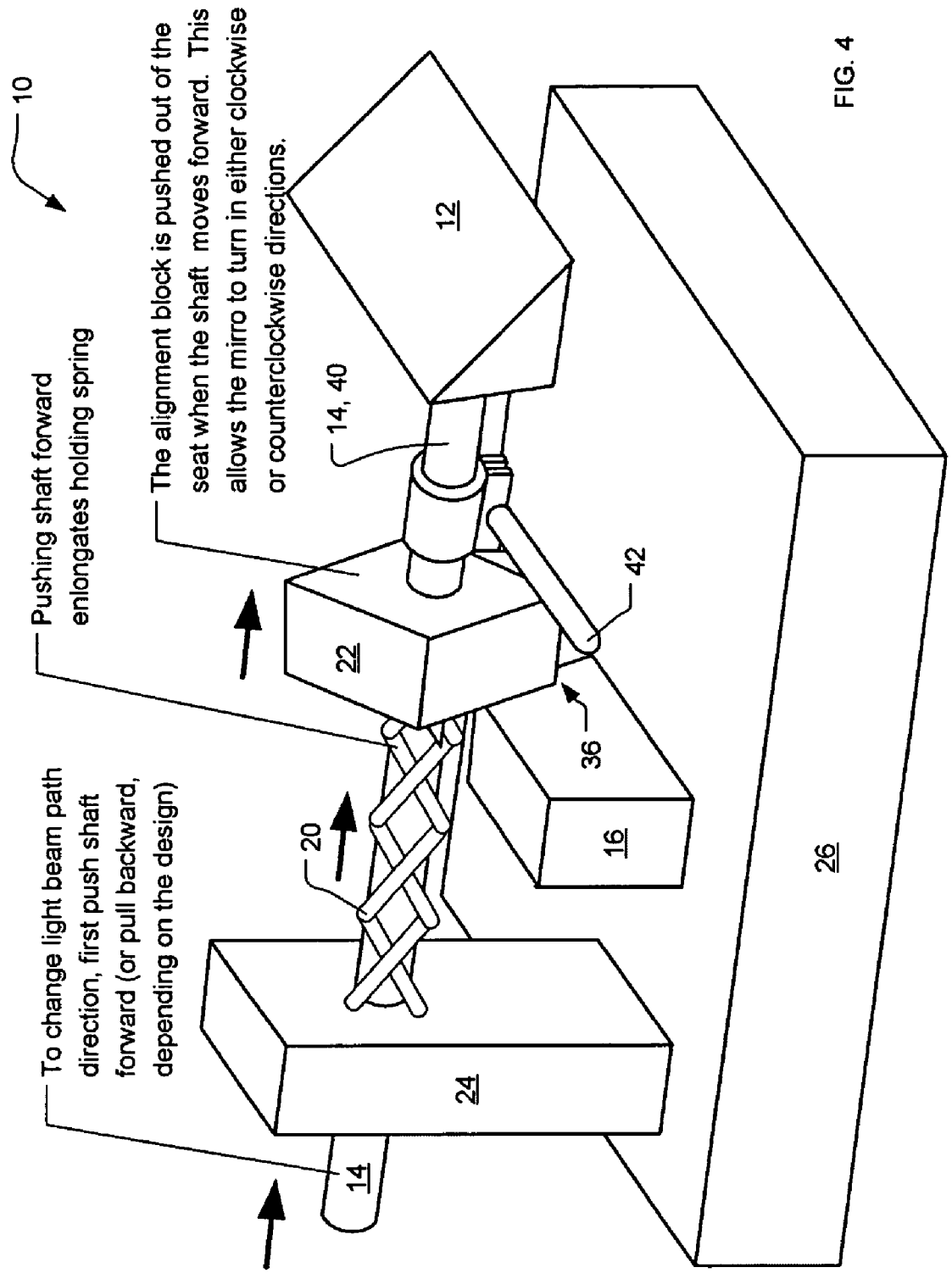
FIG. 4 is a conceptual side perspective view showing other usage related detail for the basic OAM introduced in FIG. 2.

FIG. 4 is a conceptual side perspective view showing other usage related detail for the basic OAM 10 introduced in FIG. 2. In particular, this figure shows how bending the direction of the light beam 34 from the YZ plane to the XZ plane can be accomplished by pushing (or pulling) the shaft 14 so that the square section 22 is disengaged from the V-groove 36 in the mounting base 16. The shaft 14 is then rotated by the handle 42 on the frontal portion 40 of the shaft 14, to turn it by 90-degrees. The next corner of the square section 22 is then matched with the V-groove 36 in the mounting base 16 and the shaft 14 is retracted (or elongated) to its original length. The V-groove 36 in the mounting base 16 thus allows the square section 22 of the shaft 14 to be seated at the bottom of the V-groove 36, with the help of gravity.

Figure 5:
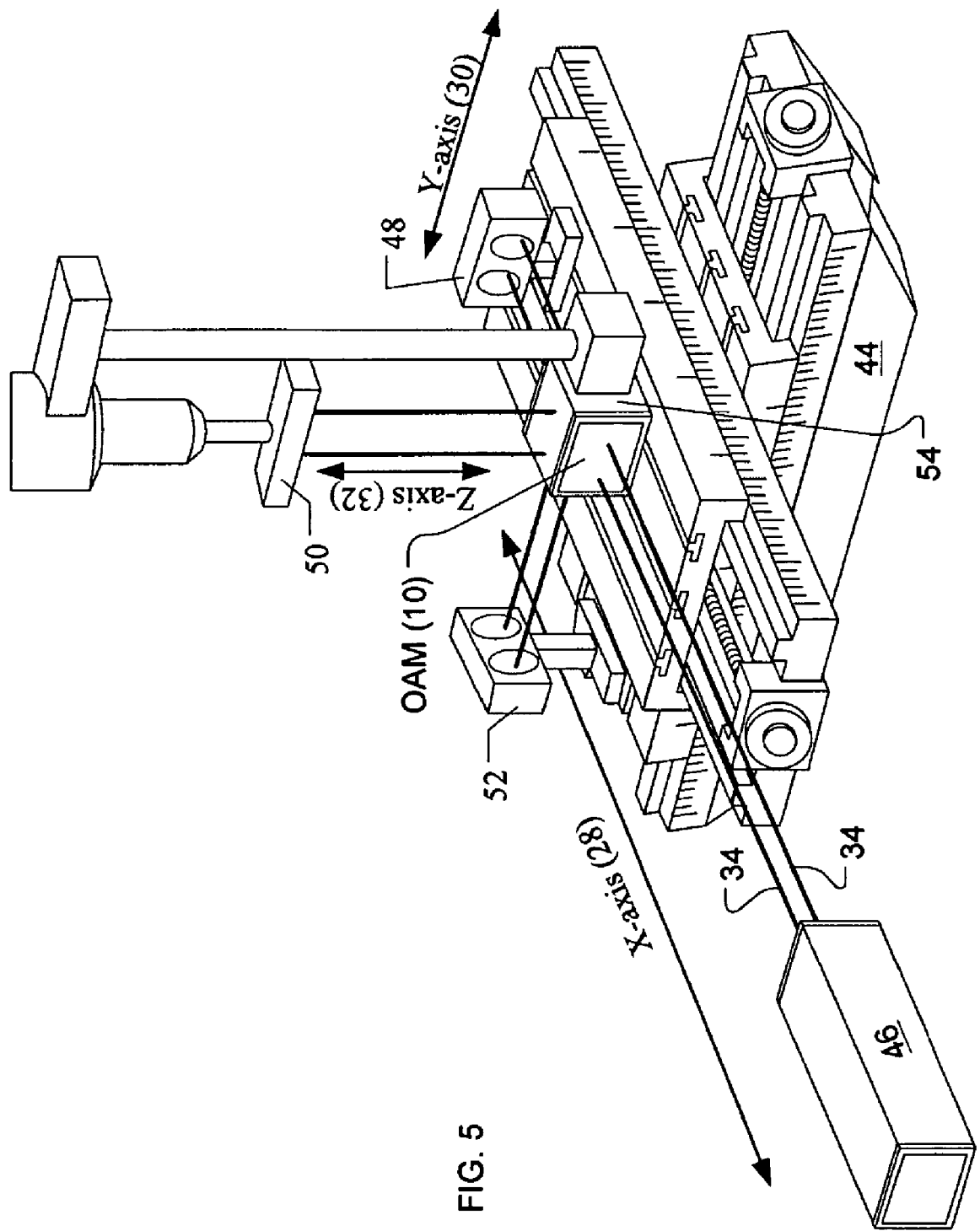
FIG. 5 is a conceptual side perspective view showing the basic OAM introduced in FIG. 2 being employed in a typical application on a multi-axis machine tool.

FIG. 5 is a conceptual side perspective view showing the basic OAM 10 introduced in FIG. 2 being employed in a typical application on a multi-axis machine tool 44 (a CNC machine in FIG. 5). The machine tool 44 thus is the "workpiece" under consideration here and the OAM 10 along with a laser head 46 and an X-axis reflector 48, a Y-axis reflector 50, and a Z-axis reflector 52 constitute the measurement apparatus being used on this workpiece. The laser head 46 produces the light beam 34, or light beams 34, that are directed by the OAM 10 to and from the target reflectors 48, 50, 52.

As can be seen in FIG. 5, the components of the OAM 10 have here been placed inside a housing 54. The housing 54 has openings or windows in its walls so that the various light beams 34 being employed can enter and exit the OAM 10. In addition, alignment marks (not shown) can be engraved on the exterior of the OAM 10 for positioning it at a designated reference position. An alignment mark at the top surface of the OAM 10 can be arranged to coincide with the spindle axis of the machine tool 44, which becomes the Z-axis 32 during measurement. This Z-axis 32 then intersects with the centerline of the outbound and inbound paths of the light beam 34, if a traditional single beam laser head 46 is used, and also intersects with the axis of the shaft 14 of the OAM 10. When a dual beam laser interferometer is used as the laser head 46, such as Excel Precision Corporation's 1100B system, the Z-axis 32 can be defined to be between the paths of the two light beams 34.

The housing 54 is preferably made of a durable material so that it will not be easily scratched or deformed. Its dimensions are also, preferably, accurately manufactured so that adjacent surfaces are perpendicular to each other. This perpendicularity can then be used to reduce the effort of alignment during set up. The bottom of the housing 54 can be made magnetic, by attaching a sheet magnet, incorporating an electro magnet, etc., so that the OAM 10 can also be easily attached to the bed of the machine tool 44 (which usually is made of steel). An alternative approach is to mount the OAM 10 to the spindle housing of the machine tool 44 with a fixture. This fixture can be designed to ensure that the center of the OAM 10 is coaxial with the spindle axis. By using this approach, the bed of the machine tool 44 does not have to come or return to the reference position after measurement.

To ease the effort of alignment, the surface of the housing 54 can also be reflective. This permits reflecting the incoming light beam 34 back to the laser head 46 along its original path when the OAM 10 is aligned properly for this. An alternate is to attach an "alignment target" to the exterior of the housing. Such an alignment target preferably has the same dimension as the exterior surface and has reference marks on it. The background of such a reference mark can be reflective so that the user can easily adjust the orientation of the laser head 46 during the alignment process.

Figure 6:
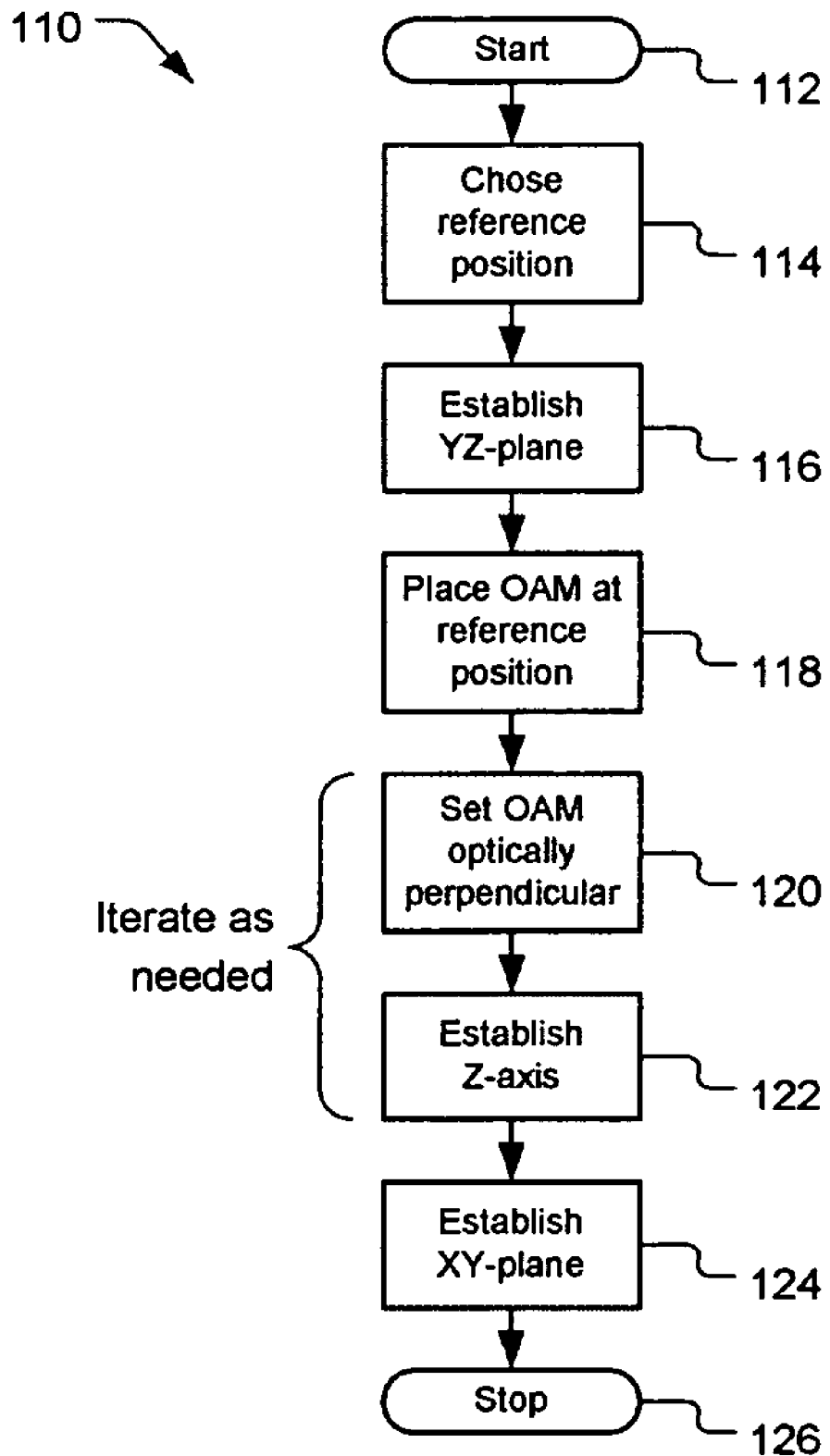
FIG. 6 is a flow chart of an example optical alignment set-up process in accord with the present invention, to use in the calibration of a multi-axis machine tool.

FIG. 6 is a flow chart of an example optical alignment set-up process 110 in accord with the present invention, to use in the calibration of a multi-axis machine tool, such as the machine tool 44. Briefly, this approach establishes a reference position at the beginning of the measurement process, and then places a reference optical device (the OAM) at this reference position that directs light beams to the different axes of interest. In this manner, a laser head does not need to be repositioned once it has been established. In general, the approach used here is to create the light beam at a source point and direct it along the X-axis to the OAM. Depending on how the OAM is presently configured, the light beam is then passed (unpurturbed) to a target X-stage reflector, reflected to a target Y-stage reflector, or reflected to a target Z-stage reflector. The respective target reflector then reflects the light beam to a sensor point. The source point and the sensor point can be essentially the same, typically being in a laser head. This is preferable and simplifies matters considerably, but it is not an actual requirement. When this is the case and laser head along with the carriage, stage, or spindle of the machine tool are in proper alignment, the light beam simply travels from laser head, to the OAM, to the target reflector, back to the OAM, and back to the laser head.

With continued reference to FIG. 5 as well, the details of the set-up process 110 in FIG. 6 are as follows:

In a step 112 the set-up process 110 starts, and in a step 114 a reference position is chosen nominally at the intersection of the axis of Z-stage movement (spindle movement for a CNC machine) and the XY-plane of the machine tool.

In a step 116, the YZ plane of the machine tool is established. A plane mirror is set-up on the X-stage that reflects the light beam from a laser head which has been mounted on a suitable adjusting device, such as a tripod, to direct the light beam in the X-direction. The X-stage is then moved back and forth through all or a substantial portion of its range of motion, and the position of the laser head is adjusted so that the light beam is returned to an alignment aperture on the turret of the laser head. The YZ plane is now established, relative to the X-axis and the incoming light beam.

In a step 118, the OAM is placed on the machine tool centered at the reference position and oriented to nominally receive the light beam (of course, the OAM could also have been mounted earlier and its bending mirror moved to simply not receive the light beam).

In a step 120, the OAM is set-up by reflecting the light beam off of an external plane mirror on its surface and back to the laser head. Since the laser head has already been set up to be perpendicular to the YZ-plane, the orientation of the OAM can now be adjusted so that the light beam is reflected back into the alignment aperture on the turret of the laser head. The external plane mirror used as an alignment target for aligning the OAM here can be provided in various manners. For example, it can be temporarily attached to the OAM; it can be movably attached to the OAM, so that it can be moved into and out of the path of the light beam; or it can be an made a permanent part of the front (laser head proximal face) of the housing of the OAM and moved into and out of the path of the light beam by operation of the Y-stage of the workpiece. The latter approach is preferred by the inventor, and this alignment target and others (reflective or otherwise) on other faces of the OAM can be provided with reference marks to yet further improve upon the utility of the OAM.

Once the OAM is set-up in this manner its front face is co-planar with the YZ-plane of the machine tool, and its bending mirror can be into 45 degree relationships with these planes. For the sake of discussion, we can term the OAM to now be "optically perpendicular" to the incoming light beam (or beams). In general, it is preferable to construct the OAM so that all of its adjacent surfaces are perpendicular.

In a step 122, the Z-axis is established. A plane mirror is set-up on the Z-stage and the bending mirror of the OAM is now set to reflect the light beam in the (upward) Z-direction. The Z-stage is now moved back and forth through all, or a substantial portion, of its range of motion, and the position of the OAM is adjusted as needed so that the light beam is returned to the alignment aperture on the turret of the laser head. (If Z-stage or spindle movement causes the light beam to deviate from coaxiality, this is an indication of non-squareness or in-perpendicularity between the Z-axis and the XY-plane. Such non-squareness is measurable, as described presently.) Note in particular that the laser head is not moved. Both the YZ plane and the Z-axis are now formally established.

However, since this centering of the OAM on the Z-axis in this manner may disturb the optically perpendicular set-up of the OAM of step 120, in actual practice step 120 and step 122 will be repeated until the optically perpendicular and Z-axis centered set-up of the OAM are both suitable.

In a step 124, the XY-plane of the machine tool is established. A plane mirror is set-up on the Y-stage and the bending mirror of the OAM is now set to reflect the light beam in the Y-direction. The Y-stage is then moved back and forth through all, or a substantial portion, of its range of motion, and the plane mirror used here is adjusted as need to ensure that the light beam is returned to the alignment aperture on the turret of the laser head. Note in particular again that the laser head is not moved.

In a step 126 the set-up process 110 stops. The establishment of the XY plane, the YZ plane, and the Z-axis now enables the measurement of the complete set of 21 parameters for the machine tool without the need to reposition the laser head throughout the measurement process. The XY-plane, the YZ plane, and the Z-axis at their intersection are now all formally established for the machine tool. The intersection of the axis of the shaft holding the bending mirror of the OAM with the Z-axis of the machine tool provide a set reference point for further calibration operations on the machine tool.

Summarizing, to facilitate the above approach, a preferred embodiment of the OAM should: (a) permit performing the task of alignment in all three axes; (b) permit measuring the squareness among the three of the XY-, YZ-, and ZX-plane; and (c) maintain good repeatability for rotational movement.

Figure 7:
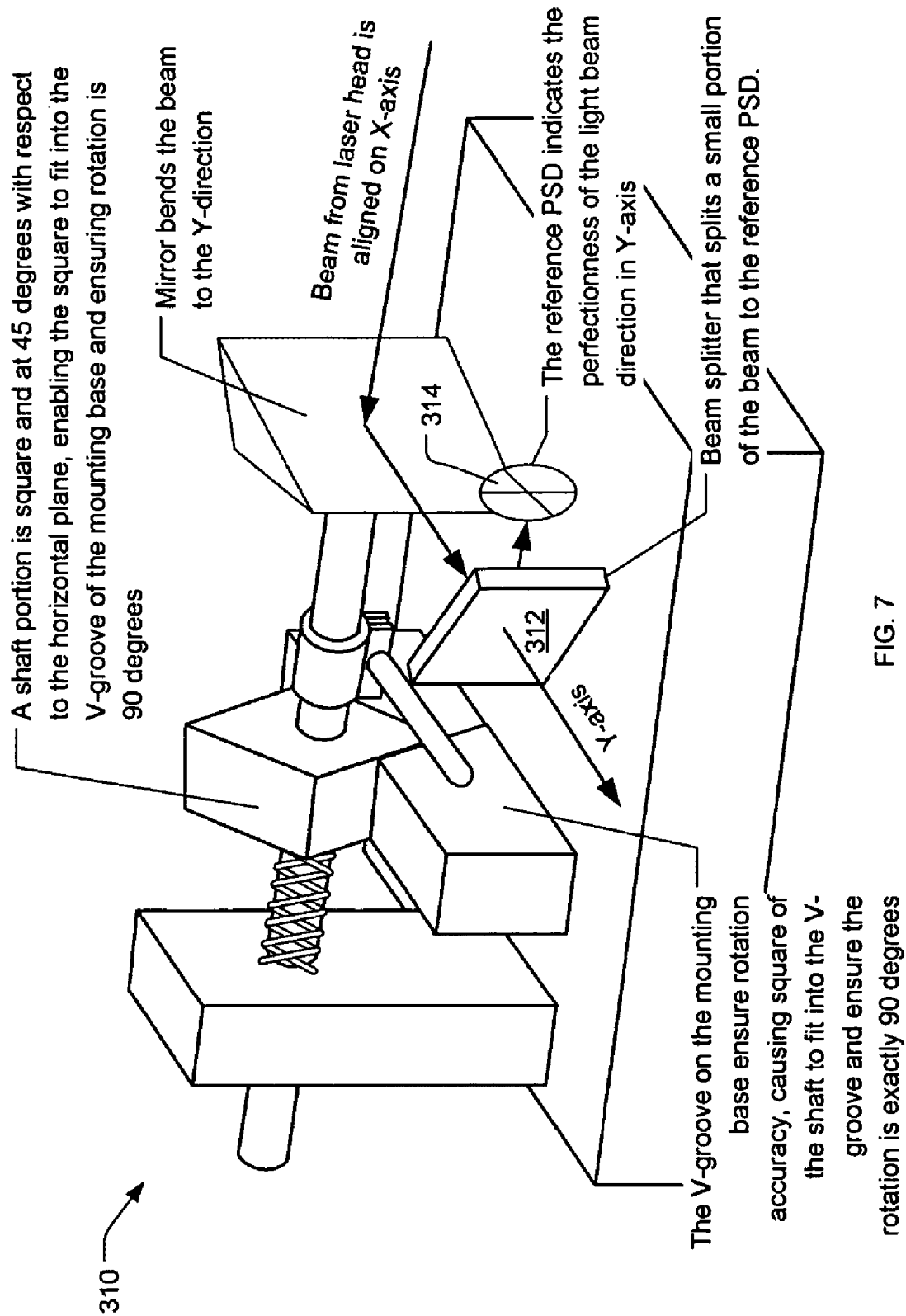
FIG. 7 is a conceptual side perspective view showing a more sophisticated optical alignment module.

FIG. 7 is a conceptual side perspective view showing a more sophisticated optical alignment module, an OAM 310. To further improve the accuracy of the beam bending angle, a beam splitter 312 and a reference positive sensitive detector (reference PSD 314) are provided and used to detect the orientation of the light beam 34 after it is reflected by the bending mirror 12. For example, the beam splitter 312 and the reference PSD 314 can be installed inside the OAM 310. The beam splitter 312 then splits out a small amount of the reflected light beam 34 and directs it to the reference PSD 314. The position of the reference PSD 314 is preferably pre-calibrated so that the deflected amount of the light beam 34 falls on the center of the reference PSD 314 when the light beam 34 is perfectly deflected by 90-degrees. This sensor-based technique can indicate just how well the light beam 34 is deflected and can therefore permit the user to easily make proper adjustment of the laser head 46 and the OAM 310 until the reference PSD 314 indicates that the deflection of the light beam 34 is within a desired range.

Figure 8:
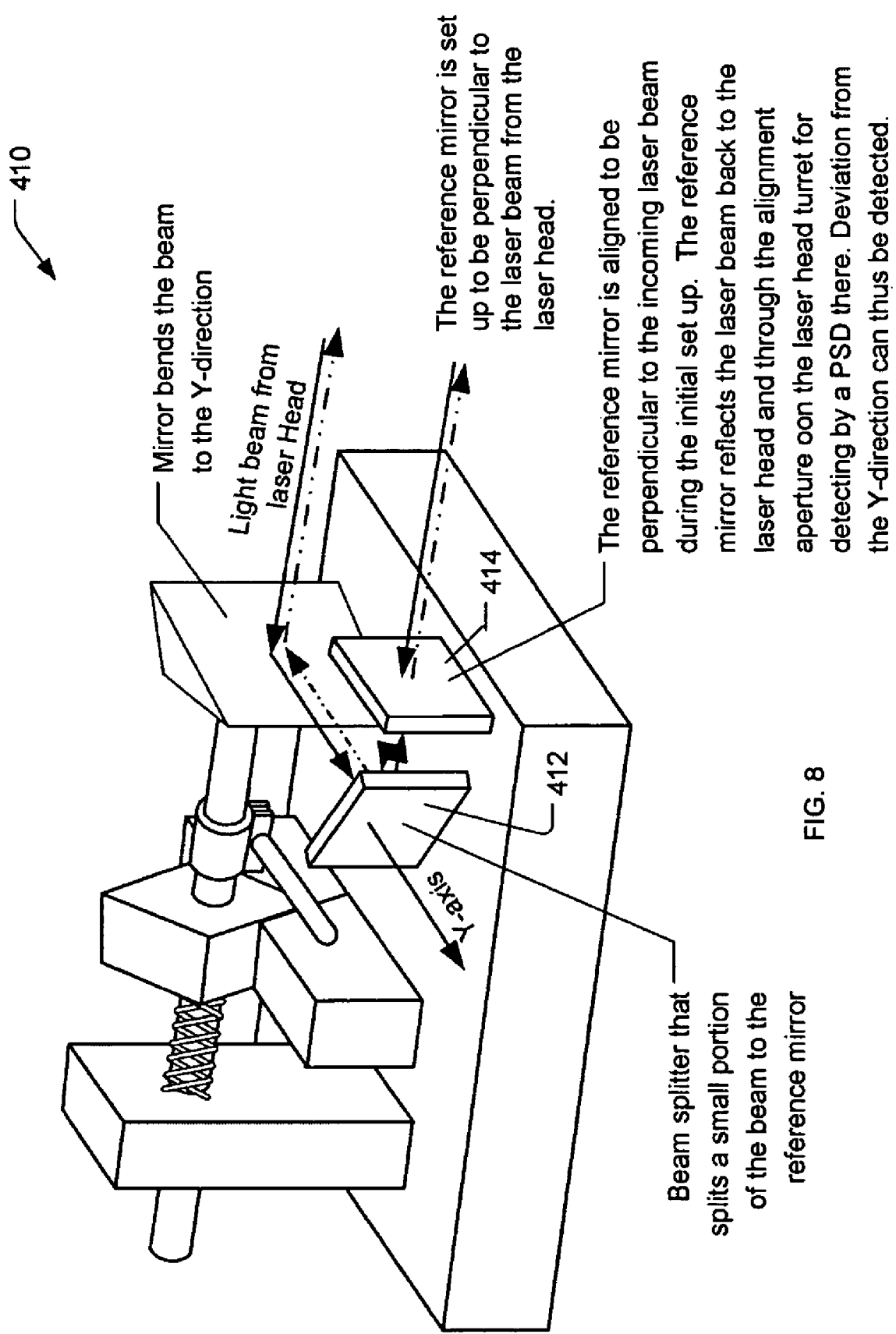
FIG. 8 is a conceptual side perspective view showing an alternate, more sophisticated optical alignment module.

FIG. 8 is a conceptual side perspective view showing an alternate, more sophisticated optical alignment module, an OAM 410. Here a beam splitter 412, potentially the same as the beam splitter 312, deflects out a small amount of the intensity of the light beam 34 to a reference mirror 414. The reference mirror 414 is preferably pre-calibrated so that the light beam 34 is then reflected back to the laser head 46 along the same path as the incoming beam. If this beam deflection is perfect, the returning portion of the light beam 34 enters the laser alignment aperture on the laser head turret.

Installation of either the reference PSD 314 or the reference mirror 414 allows the user to measure the orthogonality among the three axes 28, 30, 32. This can be accomplished because the reference PSD 314 or the reference mirror 414 are pre-calibrated to a known value by a squareness standard at the factory. If the OAM 310, 410 is set up so that the light beam 34 exits the OAM and reaches the moving target reflector 48, 50, 52, and if this target is a plane reflector, the light beam 34 is then reflected back along the same optical path from the laser head 46 when the moving axis is perfectly perpendicular to the axis of the laser head 46.

Figure 9:
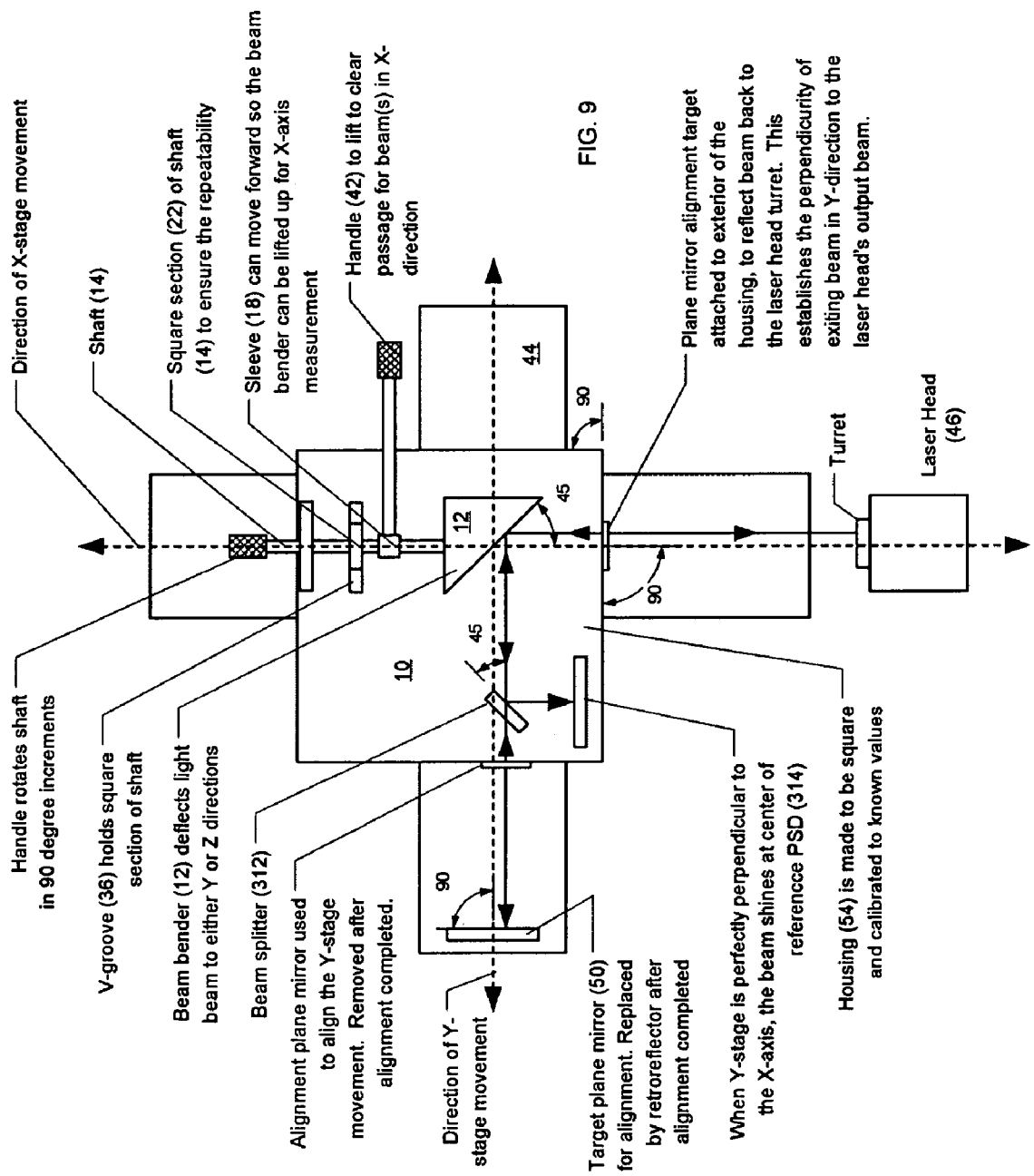
Figure 10:
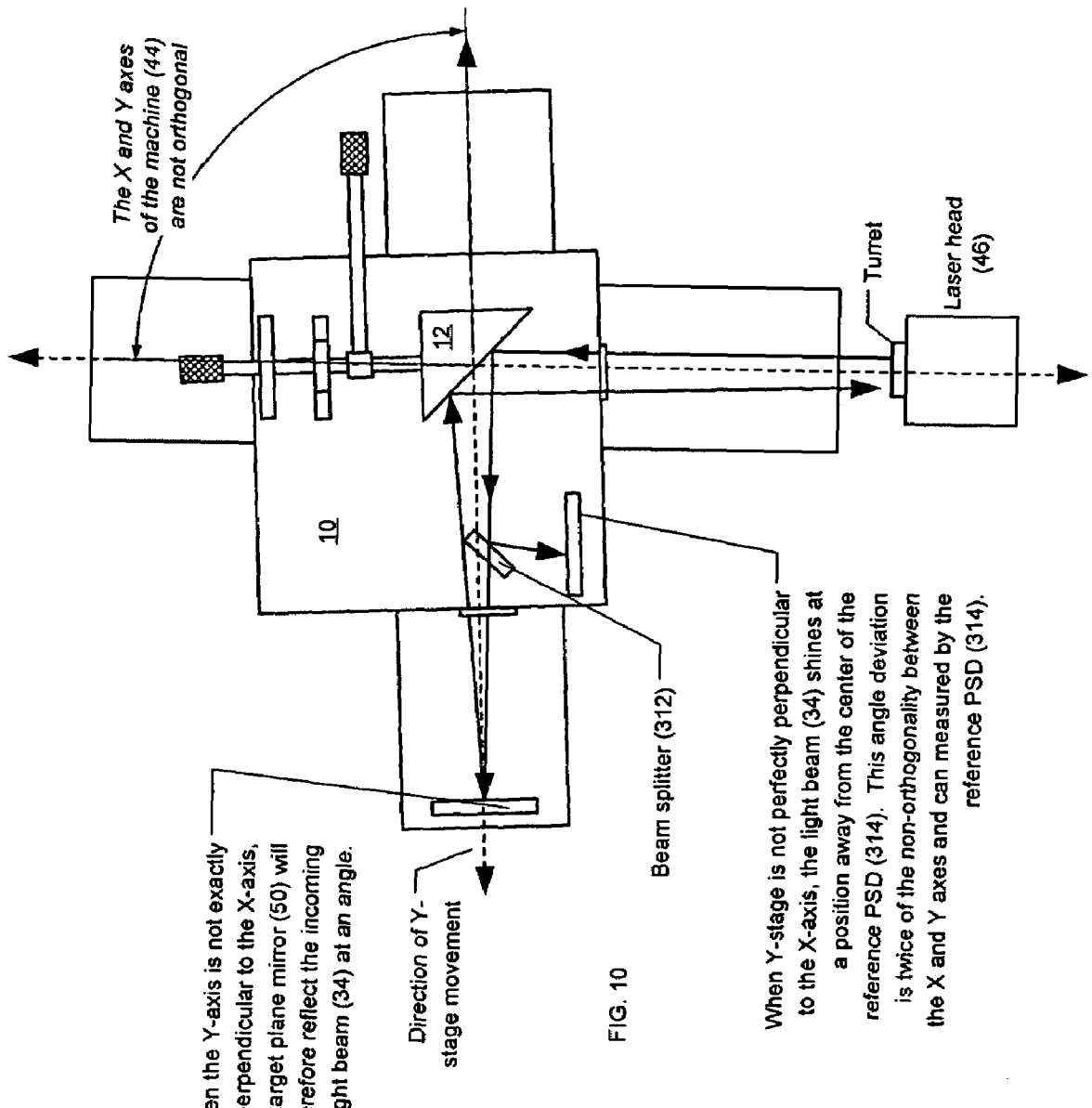

Non-orthoganality between two of the axes 28, 30, 32 will cause transverse deviation of the light beam 34 from the bending mirror 12 in the OAM 310, 410, which will shine on the reference PSD 314 or the reference mirror 414 at a position away from its center. The reference PSD 314 or the reference mirror 414 can thus provide angular information about the returned light beam 34, and therefore about the orthogonality between the moving axis of the machine tool 44 and the axis of the laser head 46. FIG. 9-10 are conceptual top views showing how the embodiments of the OAM 310, 410 of FIG. 7-8 can be used to observe this.

For Excel Precision Corporation's 1100B laser interferometer system, the direction of deviation of the reflected light beams 34 can be detected by a PSD in the laser head 46, and this will typically be more sensitive than use of the reference PSD 314 in the OAM 310 because the path of the light beam 34 is longer and therefore exhibits more of any transverse deviation that is present. FIG. 9 shows the paths of the light beam 34 when the X and Y stage movements are perpendicular, and FIG. 10 shows how non-orthogonality is measured when Y-movement is not exactly perpendicular to the X-stage. The Z-axis perpendicularity measurement can be performed in the same fashion as for the Y-axis.

In summary, a new technique is proposed for simultaneously aligning the three axes 28, 30, 32 (XY, YZ, ZX) of a machine tool 44. This alignment technique can reduce the time and manpower needed to calibrate these systems by almost one-third that of current schemes. A device (herein termed the optical alignment module or OAM) is described that has been designed with this in mind. The installation of a reference PSD 314 or a reference mirror 414 in the OAM 10, 310, 410 further enables the user to measure orthogonality among the three axes 28, 30, 32 (XY, YZ, ZX). Thus, when a dual-beam laser interferometer (such as Excel Precision Corporation's 1100B) is used, all 21 parameters (or more) of the multi-axis machine tool 44 can be aligned simultaneously with a single set up.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A method for establishing a reference point for a multi-axis machine tool having an X-stage movable along an X-axis, a Y-stage movable along a Y-axis, and a Z-stage movable along a Z-axis, the method comprising:
   (a) establishing a YZ-plane for the machine tool by:
       (1) reflecting a light beam from a laser head off of an X-reflector on the X-stage such that said light beam is sensed by an interference detector; and
       (2) moving the X-stage and repositioning said laser head and said X-reflector as needed such that said light beam remains sensed by said interference detector, thereby aligning said light beam with the X-axis;
   (b) placing an optical alignment module (OAM) having a beam bending mirror on the X-stage with said beam bending mirror nominally centered about the Z-axis;
   (c) aligning said OAM optically perpendicular to said light beam, thereby aligning said OAM relative to said YZ-plane;
   (d) establishing the Z-axis of the machine tool by:
       (1) setting said beam bending mirror to deflect said light beam from the X-axis to the Z-axis;
       (2) reflecting the light beam off of a Z-reflector on the Z-stage such that said light beam is sensed by said interference detector; and
       (3) moving the Z-stage and repositioning said OAM as needed relative to the X-axis and the Y-axis such that said light beam remains sensed by said interference detector, thereby aligning portions of said light beam parallel to both of the X-axis and the Z-axis; and
   (e) establishing an XY-plane for the machine tool by:
       (1) setting said beam bending mirror to deflect said light beam from the X-axis to the Y-axis;
       (2) reflecting said light beam off of a Y-reflector on the Y-stage such that said light beam is sensed by said interference detector; and
       (3) moving the Y-stage and repositioning said Y-reflector as needed relative to the X-axis and the Z-axis such that said light beam remains sensed by said interference detector, thereby aligning portions of said light beam parallel to both of the X-axis and the Y-axis.

2. The method of claim 1, wherein the machine tool has a bed, and further comprising mounting said OAM on the bed.

3. The method of claim 1, wherein said (b) includes mounting an adjustable fixture on the machine tool and mounting said OAM in said fixture, and at least one of said (c), (d)(3), and (e)(3) includes adjusting said fixture so that said OAM is centered coaxial with respect to at least one of the X-, Y-, and Z-axes.

4. The method of claim 1, wherein said (b) is performed prior to said (a) and said (b) includes setting said OAM to propagate said light beam through said OAM.

5. The method of claim 1, wherein at least one of said (d)(2) and said (e)(2) further comprises:
   splitting out a reference portion from said light beam after said beam bending mirror; and
   sensing said reference portion with a reference position sensitive detector, thereby permitting determination of non-orthogonality between the X-, Y-, and Z-axes.

6. An optical alignment module (OAM) for establishing a reference point for a multi-axis machine tool when an X-stage of the machine tool that is movable along an X-axis and has an X-reflector, a Y-stage of the machine tool that is movable along a Y-axis and has a Y-reflector, and a Z-stage of the machine tool that is movable along a Z-axis and has a Z-reflector, comprising:
   a main base to support the OAM on the machine tool;
   a mounting base on said main base; and
   a bending mirror movably mounted in said mounting base, to receive a light beam from a laser head that is incoming nominally along the X-axis and to:
       deflect said light beam from the X-axis to the Z-axis, to the Z-reflector, and to an interference detector; or
       deflect said light beam from the X-axis to the Y-axis, to the Y-reflector, and to said interference detector.

7. The OAM of claim 6, wherein the machine tool has a bed, and said main base mounts the OAM on the bed.

8. The OAM of claim 7, wherein said mounting base includes a fixture to mount the OAM on the machine tool, wherein said fixture is adjustable to permit centering of said bending mirror coaxial with respect to at least one of the X-, Y-, and Z-axes.

9. The OAM of claim 6, wherein said main base mounts the OAM in a fixture mount on the machine tool.

10. The OAM of claim 6, wherein said bending mirror is on a rotatable shaft to movably alternate deflection of said light beam from the X-axis to the Z-axis or the Y-axis.

11. The OAM of claim 10, wherein said mounting base has a base mating surface and said shaft has a shaft mating surface and said base mating surface and said shaft mating surface fit together to rotate said bending mirror in 90-degree steps.

12. The OAM of claim 10, wherein said shaft includes a bending mechanism to move said bending mirror to not receive and deflect said light beam from the X-axis and instead pass said light beam to the X-reflector and to said interference detector.

13. The OAM of claim 6, further comprising a housing containing said mounting base and said bending mirror, wherein said main base forms an exterior surface of said housing.

14. The OAM of claim 13, further comprising at least one alignment target on at least one exterior surface of said housing to assist in aligning said light beam relative to the OAM.

15. The OAM of claim 14, wherein said alignment targets are movable or removable to permit passage of said light beam.

16. The OAM of claim 14, wherein said alignment targets have reference marks on a reflecting background to reflect said light beam when aligning said light beam relative to the OAM.

17. The OAM of claim 13, further comprising a linkage to said shaft to operate said rotatable shaft external from said housing.

18. The OAM of claim 17, wherein:
said housing further contains a bending mechanism to move said bending mirror to not receive and deflect said light beam from the X-axis and instead pass said light beam to the X-reflector and to said interference detector; and
said linkage further to operate said bending mechanism external from said housing.

19. The OAM of claim 13, wherein respective adjacent exterior surfaces of said housing are perpendicular to each other.

20. The OAM of claim 6, further comprising a beam splitter to split out a reference portion from said light beam after said beam bending mirror.

21. The OAM of claim 20, further comprising a reference position sensitive detector to receive said light beam from said beam splitter and to sense said reference portion to permit determination of non-orthogonality between the X-, Y-, and Z-axes.

22. The OAM of claim 21, further comprising:
a housing containing said mounting base, said bending mirror, said beam splitter, and said reference position sensitive detector, wherein said main base forms one exterior surface of said housing and respective exterior adjacent surfaces of said housing are perpendicular to each other; and
said bending mirror, said beam splitter, and said reference position sensitive detector are all contained within said housing to be operable in reference to said exterior surfaces so that the light beam is received and deflected with respect to mounting of the OAM.

23. The OAM of claim 20, further comprising a reference mirror to receive said light beam from said beam splitter and reflect said light beam back to said laser head for sensing said reference portion there to permit determination of non-orthogonality between the X-, Y-, and Z-axes.

24. The OAM of claim 23, further comprising:
a housing containing said mounting base, said bending mirror, said beam splitter, and said reference mirror, wherein said main base forms one exterior surface of said housing and respective exterior adjacent surfaces of said housing are perpendicular to each other; and
said bending mirror, said beam splitter, and said reference mirror are all contained within said housing to be operable in reference to said exterior surfaces so that the light beam is received and deflected with respect to mounting of the OAM.

25. An optical alignment module (OAM) for establishing a reference point for a multi-axis machine tool with an X-stage of the machine tool that is movable along an X-axis having an X-reflector, a Y-stage of the machine tool that is movable along a Y-axis having a Y-reflector, and a Z-stage of the machine tool that is movable along a Z-axis having a Z-reflector, comprising:
base means to support the OAM on the machine tool;
mounting means on said base means; and
light bending means for receiving a light beam from a laser head that is incoming nominally along the X-axis; and said light bending means further movably mounted in said mounting means for:
deflecting said light beam from the X-axis to the Z-axis, to the Z-reflector, and to an interference detector; or
deflecting said light beam from the X-axis to the Y-axis, to the Y-reflector, and to said interference detector.

* * * * *